Sept. 22, 1959  J. V. CROTTY ET AL  2,905,484
VALVE ASSEMBLY

Filed June 4, 1956  2 Sheets-Sheet 1

INVENTORS
JOHN V. CROTTY &
JOHN C. TITTLE, JR.
BY
ATTORNEY

Sept. 22, 1959  J. V. CROTTY ET AL  2,905,484
VALVE ASSEMBLY
Filed June 4, 1956  2 Sheets-Sheet 2
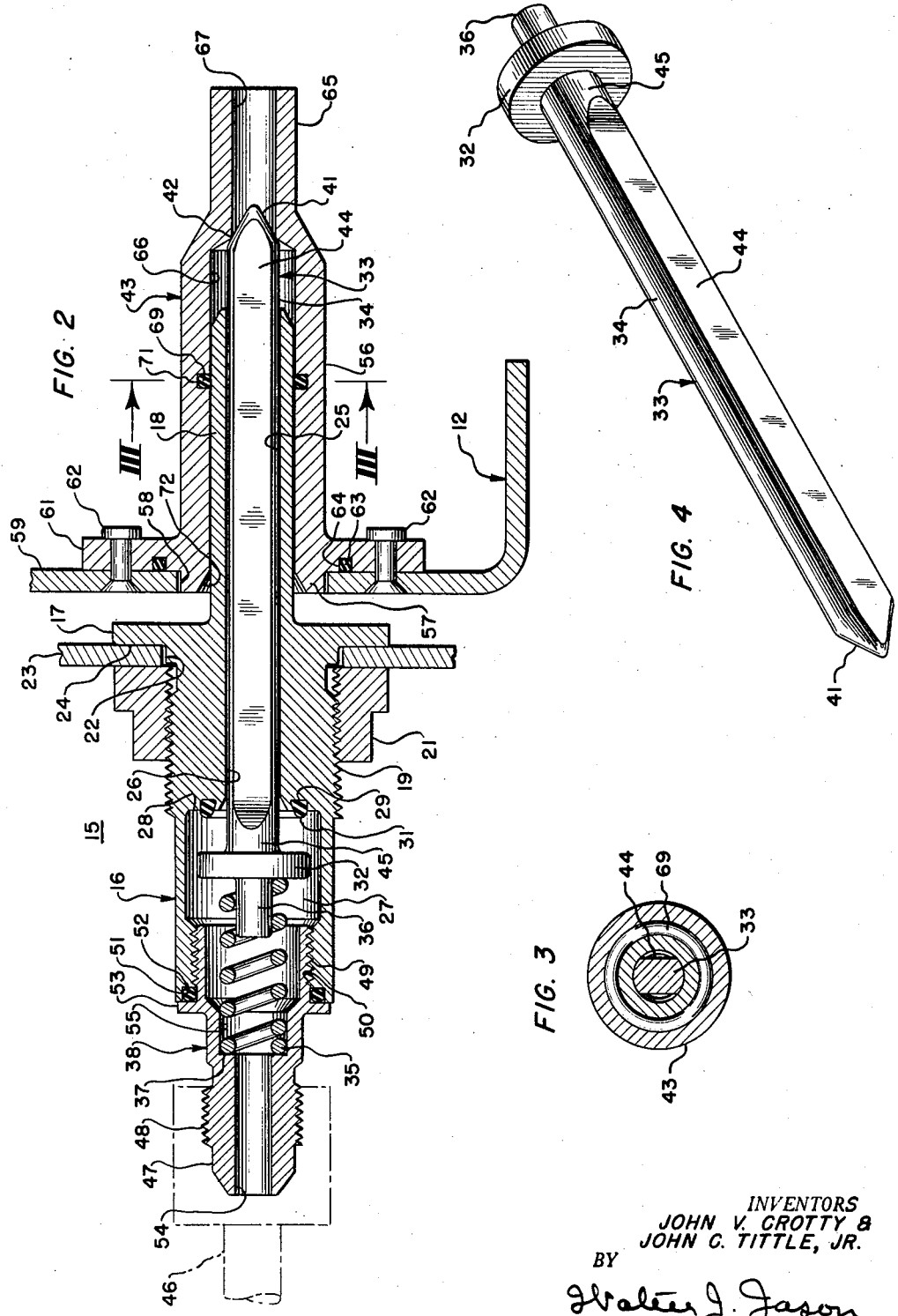
INVENTORS
JOHN V. CROTTY &
JOHN C. TITTLE, JR.
BY
*Walter J. Jason*
ATTORNEY

2,905,484

VALVE ASSEMBLY

John V. Crotty and John C. Tittle, Jr., Fort Worth, Tex., assignors to General Dynamics Corporation, San Diego, Calif., a corporation of Delaware Application June 4, 1956, Serial No. 589,263

8 Claims. (Cl. 284—18)

The present invention relates generally to valve devices and more particularly to an improved valve structure which is adapted to pass coolants for cooling an associated element and which further serves to assist in positioning and mounting of the element to be cooled.

Although the present invention has general application, it is well suited for use in the electronic field. In the electronic arts, frequently the number of instruments involved in achieving a desired electronic operation is quite great. To save space and for convenience of servicing and maintenance the instruments are compactly grouped, housed in unit cabinets, and these unit cabinets are fitted to or located upon a common support which may itself form an enclosure. Usually associated with any large number of grouped instruments and cabinets is a cooling system to dissipate the heat generated during the operation of the confined instruments and prevent damage to such instruments from this heat. The present invention has been evolved for use in connection with electronic instruments where it is required to cool the area of such instruments.

The present invention is adapted for use not only with ground located electronic installations but also with airborne electronic equipment where the matter of prevention of over-heating and possible damage to such equipment is of vital concern. As is known, there has been a growing tendency in the field of aircraft to rely on electronic devices to accomplish control, operation, and various other missions. The number of electronic instruments carried by present day aircraft is quite substantial and because of space limitations in the airplane it is most important to properly and compactly group and house the instruments. Conveniently, suitable mounting racks are secured to the structure of the airplane to accommodate slidable chassis or electronic equipment packages.

Though the electronic instruments have been suitably housed and compactly located, care must be exercised to maintain an environmental temperature within a suitable safe range to assure proper operation of the instruments and desirably provision should be made to prevent movement or shifting of the instruments relative to their support. It is, therefore, an object of this invention to provide an improved device which functions to pass coolant fluid such as air into an associated chassis or electronic package, and to maintain such in place.

It is also an object of the present invention to provide an improved form of connecting element or pin which is adapted to be received within a body to be cooled and which is valved for the passage of a coolant, and which connecting element embodies movable structure which automatically acts to stop the flow of the coolant air when the connecting element is disengaged from the mating receptacle of the associated body.

Another object of this invention lies in the provision of a valved device which is automatically operable to release the flow of coolant fluid into an instrument carriage upon engagement with a fitting borne by the carriage while simultaneously serving to assist in the support of the instrument.

Another object of this invention is to provide a novel form of valved connecting element of the character above which is simple in construction, is economical to manufacture, and which is effective in operation.

Other objects and features of the present invention will be apparent to those skilled in the art from the following specification and appended drawings wherein is illustrated a preferred form of the invention, and in which:

Figure 2 is a longitudinal sectional view illustrating the valved connecting pin of the present invention, shown engaged with a receptacle fitting provided by an instrument chassis to be cooled.

Figure 3 is a transverse sectional view taken on the line III—III of Figure 2.

Figure 4 is a perspective view of a valve element; and

Figure 1:
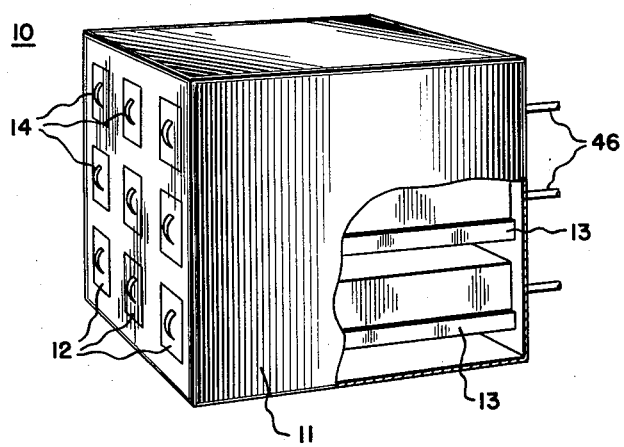
Figure 1 is a perspective view of a typical installation for storage of electronic equipment.

Referring now with particularity to the drawings, there is shown in Figure 1 a typical electronic equipment installation indicated generally by the numeral 10, which is herein selected merely to illustrate a use of the present invention. Installation 10 embodies a rack or housing 11 of conventional design upon which is mounted a plurality of individually enclosed chassis or electronic equipment packages 12. The particular type or quantity of electronic devices comprising these chassis or packages forms no part of this invention, it being assumed that these devices are of usual character and are assembled and arranged in the quantity and of the type required to effect a desired electronic function or functions. The particular electronic components, such as tubes, resistors, capacitors and the like, which may comprise a chassis are not shown since their particular construction is not within the contemplation of this invention.

Chassis or electronic packages 12 embodied in the typical installation here assumed are slidably and removably fitted to rack 11 resting upon usual rails 13, and having handles 14 to facilitate movement.

Associated with each of the chassis 12 is a valved connecting assembly 15, the construction of which is shown in Figures 2 and 3. Assembly 15 comprises a generally cylindrical valve body portion 16 having a radially extending flange 17 and a projecting nose or pin portion 18 in longitudinal extension with valve body portion 16. Valve body portion 16 is externally threaded as at 19 adjacent flange 17 to accommodate a lock nut 21. As shown, assembly 15 extends through an opening 22 provided in a wall or panel 23 which forms part of the rack or housing 11 to dispose flange 17 with its face 24 abutting against the inner surface of wall 23. Lock nut 21 which will be disposed on the opposite side of wall 23 cooperates with flange 17 to grasp wall 23 therebetween and firmly mount valved assembly 15 to the wall.

Nose portion 18 is provided with a longitudinally extending axial bore 25 which communicates through a co-extensive bore 26 in valve body portion 16 with an enlarged bore or chamber 27 within portion 16. Within defining end wall 28 of chamber 27 is provided an annular groove 29 which receives a resilient sealing ring 31 formed of rubber or any appropriate sealing material. As shown, the groove 29 is formed with one end wall sloped or inclined for the purpose of frictionally retaining ring 31 therewithin when forced into groove 29. When in place, a portion of ring 31 protrudes outwardly from wall 28 into chamber 27 and is engageable by an annular valve head 32 of a poppet valve 33. Poppet valve 33 includes an elongated valve stem 34 which is slidably positioned within co-extensive bores 25 and 26. Valve 33 is urged towards closed position by means of a spring 35 which encircles a valve projection 36 and extends between a seat on valve head 32 and an abutment 37 provided by a fitting 38, which fitting will be later described in detail.

Valve stem 34 of valve 33 is provided with a chamfered tip 41 adapted to engage with an abutment 42 of receptacle or fitting 43 (to be described) which is provided by each chassis 12 which is to be cooled. As shown, valve stem 34 has a flattened appearance effected by the provision of a pair of chordally disposed flats 44 located on opposite sides of the stem 34 and extending longitudinally from chamfered tip 41 to terminate at a cylindrical stem portion 45 adjacent valve head 32. With this construction, passage-ways are provided for the flow of air on either side of the stem 34 when valve 33 is in open position (as in Figure 2) against the bias of spring 35 with valve head 32 spaced from its seat on ring 31.

Fitting 38 which includes abutment 37 upon which one end of spring 35 seats is adapted for connection to a suitable pressure source (not shown) of coolant air, the connection being through conventional fluid conducting means such as tubing and coupling 46 (shown in phantom). Fitting 38 comprises an elongated generally cylindrical body portion 47 having external threads 48 adjacent one end to which the air conducting tubing and its coupling may be secured. Additional external threads 49 located at the inner end of the body portion 16 are adapted to engage with internal threads 50 provided in the annular wall of chamber 27 of valve body portion 16 to secure fitting 38 to valve body portion 16. Fitting 38 is sealed with respect to valve body portion 16 by a usual annular sealing member 51 which is positioned within an annular groove 52 on the end face of valve body portion 16 and is engaged by a radial flange 53 on fitting 38.

Fitting 38 is provided with an axial bore 54 which opens into an enlarged bore 55 within which spring 35 projects to rest upon abutment 37. Enlarged bore 55 communicates with chamber 27 of valve body portion 16 for the passage of air thereinto.

As stated above, each of the chassis 12 to be cooled is provided with a receptacle or fitting 43 with which valved connecting assembly 15 cooperates. Receptacle 43, as shown, comprises a generally cylindrical body portion 56 having at one end an indexing boss 57 adapted to be fitted into an opening 58 provided in a wall 59 of a chassis 12 and having a radially extending mounting flange 61 adapted for connection to wall 59 by rivets 62. The connection of receptacle 43 to wall 59 is sealed against the passage of air by means of a usual annular sealing element 63 disposed in an annular groove 64 in the end face of flange 61 and having abutment with wall 59.

Body portion 56 of receptacle 43 has a necked down portion 65 and is provided with an axial bore 66 which communicates with a reduced diameter bore 67 in axial alignment with bore 66. Bore 67 opens into the interior of the chassis or instrument housing 12 which is to be cooled. At the juncture of bore 66 with bore 67 the interior wall of bore 66 is tapered (as shown) to terminate at the abutment 42 with which the chamfered end 41 of valve stem 34 engages. It is noted that valve stem 34 projects beyond the end of nose portion 18 to occupy a position wherein it is readily engageable by abutment 42.

Bore 66 is adapted to slidably receive the nose or pin portion 18 of connecting element 15 and to prevent leakage therearound there is provided a conventional resilient sealing ring 69 disposed within a groove 71 in the wall of bore 66 and being frictionally engageable with the outer wall surfaces of pin portion 18.

Bore 66 at its opening through indexing boss 57 is chamfered or tapered as at 72 to permit ready insertion and guidance of pin portion 18 into bore 66.

Figure 5:
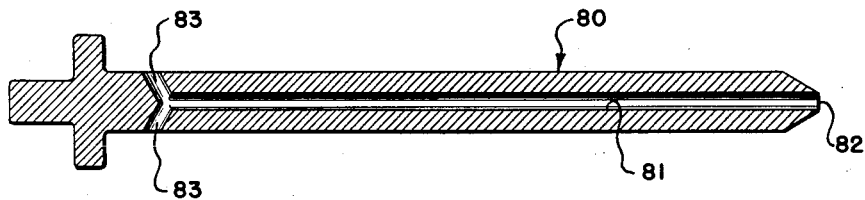
Figure 5 is a fragmentary sectional view of a modified valve element.

Figure 5 illustrates a modified form of valve which is indicated generally by the numeral 80. Valve 80 differs from valve 33 in that the flats are omitted and to permit the passage of air, a longitudinal bore 81 is provided through the valve stem, which bore opens through the chamfered end as at 82 and at its interior end communicates with two oppositely disposed generally radial passages 83 through which air may enter.

In operation, a chassis 12 is fitted into rack 11 and in being moved into position nose portion 18 of valved connecting element 15 enters bore 66 of the receptacle. Continued movement of chassis 12 toward rear wall 23 of rack 11 will effect engagement of the chamfered tip 41 with internal abutment 42 of receptacle 43 to move valve 33 rearwardly against the bias of spring 35 and space valve head 32 from its seat 31. The inner ends of the passage-ways defined by flats 44 and the interior walls of bores 25 and 26 will then be in communication with chamber 27 and coolant air may then flow from its source through fitting 38 and chamber 27 past the valve stem 34 and through bore 67 of receptacle 43 into the interior of the chassis or electronic package 12. Pin 18 being inserted into bore 66 of receptacle 43 serves to properly position its associated chassis 12 and to restrain it against movement relative to its rack 11.

When it becomes necessary to remove a chassis 12 as for servicing or replacement, movement of the chassis 12 outwardly will separate receptacle 43 from valve assembly 15 and remove the restraint on valve stem 34 thereby permitting spring 35 to move it to seat valve head 32 upon seal member 31 to automatically close off the flow of coolant air into nose position 18.

If desired valve member 80 of Figure 5 may be substituted for valve 33 of Figure 2 to accomplish similar valving action to that above described.

The present invention has been described in connection with the cooling of electronic equipment but it is understood that it is not limited to such use but is applicable to any article, device or installation where it is desired to feed a fluid.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

1. A valved connecting assembly in combination with a body to which a coolant fluid is to be supplied, said assembly comprising a body portion having a chamber therewithin, a pin portion projecting from said body portion and having a bore therethrough in communication with said chamber, a valve seat at the entrance of said bore to said chamber, a valve member movable within said chamber, a valve stem on said valve member slidably received within said bore for movably supporting said valve member for movement into and out of engagement with said valve seat to open and close the entrance to said bore, spring means normally urging said valve member into closed position, flat surfaces on said valve stem for cooperation with the interior walls of said pin portion bore to define fluid passage-ways adapted to pass fluid when said valve member is in open position, and a fitting having means to slidably receive said pin portion and means operable upon said valve stem to displace it relative to said pin portion and to move said valve member to open position against the force of said spring means.

2. A valved connecting assembly in combination with a body to which a coolant fluid is to be supplied, said assembly comprising a body portion having a chamber and a valve seat therein, a pin portion projecting from said body portion and having a bore therethrough in communication with said chamber at said valve seat, a valve member having a head and a stem, said head portion being movable within said chamber, said stem being slidably received within said bore for movably supporting said valve member and projecting through the exit opening of said bore, said valve head adapted to coact with said seat to close and open communication between said chamber and said bore, spring means operable on said valve head normally urging it into closed position, flat surfaces on said valve stem for cooperation with the interior walls of said pin portion bore to define fluid passage-ways adapted to pass fluid when said valve member is in open position, and a fitting carried by said body, said fitting comprising a body portion having a bore therethrough adapted to slidably receive said projecting pin portion, and an abutment within said fitting bore engageable with said valve stem to move said valve member and unseat said valve head to provide communication between said chamber and said fitting bore.

3. A valved connecting assembly in combination with a body to which a coolant fluid is to be supplied, said assembly comprising a generally cylindrical body portion having a chamber and a valve seat therein, a pin portion projecting from and coextensive with said body portion and having a bore therethrough in communication with said chamber at said valve seat, means on said body portion for fixedly mounting said assembly to a support, a valve member having a head and a stem, said head portion being movable within said chamber, said stem being slidably received within said bore for movably supporting said valve member and projecting through the exit opening of said bore, said valve head adapted to coact with said seat to close and open communication between said chamber and said bore, spring means operable on said valve head normally urging it into closed position, flat surfaces on said valve stem for cooperation with the interior walls of said pin portion bore to define fluid passage-ways adapted to pass fluid when said valve member is in open position, and a fitting carried by said body, said fitting comprising a body portion having a bore therethrough adapted to slidably receive said projecting pin portion, and an abutment within said fitting bore engageable with the projecting end of said valve stem to move said valve member and unseat said valve head to provide communication between said chamber and said fitting bore.

4. A valved connecting assembly in combination with a body to which a coolant fluid is to be supplied, said assembly comprising a body portion having a chamber therewithin, a pin portion projecting from said body portion and having a bore therethrough in communication with said chamber, a valve member, a valve stem on said valve member slidably received within said bore for movably supporting said valve member for movement, said valve member having a portion capable of closing the entrance to said bore, spring means normally urging said valve member into closed position, said valve stem having a passage-way opening through one end and having communication with said chamber when said valve member is in open position, and means carried by said body to receive said pin portion and being operable upon said valve stem to displace it relative to said pin portion and move said valve member to open position against the force of said spring means.

5. A valve assembly for association with a package into which fluid is to be supplied, said assembly comprising a body portion having a chamber therewithin, an elongated projecting portion extending therefrom and having a bore therethrough in communication with said chamber, a valve seat at the entrance of said bore to said chamber, a valve member having a head and an elongated stem portion movably positioned within said chamber and said bore respectively of said body, said stem portion being provided with guide means for directing flud through said bore when said valve member is in unseated position, spring means normally urging said valve head toward said valve seat to close off the entrance of said bore, and a receptacle carried by said package having a bore to slidably receive said projecting portion and having an abutment engageable by the end of said valve stem portion for movement of said valve member to unseated position against the force of said spring means.

6. A valve assembly for association with a package into which fluid is to be supplied, means for fixedly supporting said valve assembly, said valve assembly comprising a body portion having a chamber therewithin, an elongated guide and supporting portion projecting from said body portion and having a bore therethrough in communication with said chamber, a valve seat at the entrance of said bore to said chamber, a valve member having a head and a stem portion movably positioned within said chamber and said bore respectively of said body, spring means within said chamber normally urging said valve head toward said valve seat to close off the entrance to said bore, and a receptable carried by said package having a bore to slidably receive said projecting portion of said valve body portion for guidance of said receptacle into position and for support thereof in such position, said receptacle having an abutment in association with its bore engageable by the end of said stem portion of said valve member for movement of said valve member to unseated position against the force of said spring means, said stem portion having an elongated fluid guide surface along its length between said chamber and said receptacle to fluidly connect said chamber with said receptacle when said valve is in said unseated position.

7. A valve assembly for association with a package into which fluid is to be supplied, said assembly comprising a body portion having a chamber therewithin, an elongated projecting portion extending therefrom and having a bore therethrough in communication with said chamber, a valve seat at the entrance of said bore to said chamber, a valve member having a head and a generally cylindrical stem portion movably positioned within said chamber and said bore respectively of said body, chordally disposed flats located on said stem portion of said valve member spaced from said head and extending substantially to the tip of said stem for the passage of fluid through said bore when said valve member is in unseated position, spring means normally urging said valve head toward said valve seat to close off the entrance to said bore, and a receptacle carried by said package having a bore to slidably receive said projecting portion and having an abutment engageable by said tip of said valve member to move said valve member to unseated position against the force of said spring means.

8. A valve assembly for association with a package into which fluid is to be supplied, said assembly comprising a body portion having a chamber therewithin, an elongated guide and supporting portion extending therefrom and having a bore therethrough in communication with said chamber, means to fixedly mount said body to a support, a valve seat comprising a sealing ring secured to the transition wall between said chamber and said bore of said body, a valve member having a head for cooperation with said valve seat and a generally cylindrical stem portion movably positioned within said chamber and said bore respectively of said body, chordally disposed flats located on said stem portion of said valve member spaced from said head and extending substantially to the tip of said stem for the passage of fluid through said bore when said valve member is in unseated position, spring means normally urging said valve head against said sealing ring to close off the entrance to said bore, and a receptacle carried by said package having a bore to slidably receive said projecting portion of said valve body portion, said receptacle having an abutment in association with its bore engageable by the end of said stem portion of said valve member for movement of said valve member to unseated position against the force of said spring means.

References Cited in the file of this patent

UNITED STATES PATENTS

| | | |
|---|---|---|
| 1,066,066 | Vidy | July 1, 1913 |
| 1,809,127 | Johnson | June 9, 1931 |
| 2,177,278 | Hill et al. | Oct. 24, 1939 |
| 2,444,414 | Anderson | July 6, 1948 |